(12) United States Patent  (10) Patent No.: US 7,392,977 B2
Miyashiro et al.  (45) Date of Patent: Jul. 1, 2008

(54) VEHICLE SPRING

(75) Inventors: Shidehiko Miyashiro, Iwata (JP);
Satoshi Oohashi, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 163 days.

(21) Appl. No.: 11/303,877

(22) Filed: Dec. 16, 2005

(65) Prior Publication Data

US 2006/0180966 A1   Aug. 17, 2006

(30) Foreign Application Priority Data

Dec. 16, 2004  (JP) ............................. 2004-364417
Apr. 1, 2005  (JP) ............................. 2005-106919

(51) Int. Cl.
*F16F 1/06* (2006.01)
*F16D 25/06* (2006.01)

(52) U.S. Cl. ........................................ 267/179; 267/167

(58) Field of Classification Search ......... 267/166–179; 192/70.28

See application file for complete search history.

(56) References Cited

U.S. PATENT DOCUMENTS

| 4,903,985 | A | | 2/1990 | Muhr et al. |
| 4,993,376 | A | * | 2/1991 | Fukutome et al. ......... 123/90.65 |
| 5,464,198 | A | * | 11/1995 | Yanko et al. ................. 267/167 |
| 5,678,809 | A | * | 10/1997 | Nakagawa et al. .......... 267/148 |
| 5,722,645 | A | * | 3/1998 | Reitter ........................ 267/177 |
| 5,911,295 | A | * | 6/1999 | Itonaga et al. ............ 192/70.28 |
| 6,457,704 | B1 | * | 10/2002 | Van Eerden et al. ......... 267/179 |
| 6,712,346 | B2 | * | 3/2004 | Imaizumi ..................... 267/286 |
| 2002/0105127 | A1 | | 8/2002 | Imaizumi |
| 2002/0175488 | A1 | * | 11/2002 | Brandt et al. ......... 280/124.179 |

FOREIGN PATENT DOCUMENTS

DE   101 25 503 C1   12/2002

* cited by examiner

*Primary Examiner*—Christopher P Schwartz
(74) *Attorney, Agent, or Firm*—Knobbe Martens Olson & Bear LLP

(57) ABSTRACT

A spring is disclosed having a selected number of total turns so that the directions of bending at ends of spring are different when the spring is contracted. In certain embodiments, the directions of bending for the ends are centered within a ±45° span and are located 225° from terminal ends of the spring.

16 Claims, 9 Drawing Sheets

VEHICLE SPRING

RELATED APPLICATIONS

The present application is based on and claims priority under 35 U.S.C. § 119 to Japanese Patent Application No. 2005-106919, filed on Apr. 1, 2005; and Japanese Patent Application No. 2004-364417, filed Dec. 16, 2004, the entire contents of which are hereby expressly incorporated by reference herein.

BACKGROUND OF THE INVENTION

1. Field of the Invention

The present invention relates to a spring having improved durability as compared to a conventional spring.

2. Description of the Related Art

In recent years, motorcycles used for specific applications such as racing or the like utilize springs made of Ti. Springs made of Ti are lightweight as compared to conventional springs made of Fe. For example, a suspension unit that has a Ti spring may weigh 200 to 500 g (by spring constant) less than a suspension unit that utilizes a conventional spring made of Fe.

When replacing a spring made of a high strength material with a spring made of a lower strength material, the spring wire diameter must be increased in order to maintain the same spring strength. For example, when a spring made of Fe is replaced with a spring made of Ti that has the same spring constant, the wire diameter of the Ti spring must be increased to maintain the same strength as the Fe spring.

Consequently, the larger Ti spring, which is retrofitted onto a suspension unit designed for a Fe spring, has reduced clearance between the Ti spring and a cylinder of the shock absorber. This decrease in clearance may increase the chance that a compressed Ti spring contacts the cylinder and may reduce the durability of the Ti spring.

U.S. Patent Application No. 2002/0105127 proposes a spring that bends relative to a central axis thereof. The spring has first turns on both ends of the spring that are inclined relative to the spring bearing members at a predetermined angle. However, having the spring bend relative to the central axis may increase the chance that the spring may buckle when the spring is compressed. This bucking may then lead to the spring contacting the shock absorber cylinder of the suspension unit.

SUMMARY OF THE INVENTION

The systems and methods of the invention have several features, no single one of which is solely responsible for its desirable attributes. Without limiting the scope of the invention as expressed by the claims which follow, its more prominent features will now be discussed briefly. After considering this discussion, and particularly after reading the section entitled "Detailed Description of the Preferred Embodiments" one will understand how the features of the system and methods provide several advantages over traditional suspension systems.

One aspect is a spring having a first end separated from a second end by turns of the spring, wherein a total number of the turns are selected so that a direction of bending at the first end is different than a direction of bending at the second end when the spring is contracted.

Another aspect is a spring having a number of total turns according to the following formula: $N=n+0.75$, where N is the number of total turns of the spring and n is an integer.

Another aspect is a spring having a number of total turns according to the following formula: $N=n-0.25$, where N is the number of total turns of the spring and n is an integer.

Yet another aspect is a spring having a number of total turns according to the following formula (3) or (4): $N=(n+0.75)\pm0.125$ ... (3); $N=(n-0.25)\pm0.125$ ... (4), where N is the number of total turns of the spring and n is an integer.

Still another aspect is a suspension unit comprising a spring having a first end separated from a second end by turns of the spring, wherein a total number of the turns are selected so that a direction of bending at the first end is different than a direction of bending at the second end when the spring is contracted.

In certain embodiments, a number of total turns for a first spring is selected so that when the spring is in a compressed or contracted state, the directions of bending for both end sides of the spring are not aligned or different. In certain embodiments, a second spring having regions of first turns on both end sides of the spring that span about ±45°. These ±45° regions are spaced about 225° from the terminal ends of the first turns in a direction toward the second turns. The number of total turns is selected so that the ±45° regions not overlap each other. With this construction, the spring bends in different directions at the end sides of the spring when the spring is compressed or contracted.

A third spring has regions of respective first turns on one end side and the other end side that are formed about a ±45° regions centered on the points of maximum bending when the spring is contracted or compressed. The number of total turns of the spring is selected so that the ±45° regions do not overlap each other. With this construction, the spring bends in different directions at the end sides of the spring when compressed or contracted.

A fourth spring has a number of total turns that satisfies either of the following formulas (1) or (2)

$$N=n+0.75 \qquad (1)$$

$$N=n-0.25 \qquad (2)$$

where N: number of total turns of a spring and n: integral.

A fifth spring has a number of total turns that satisfies either of the following formulas (3) or (4)

$$N=(n+0.75)\pm0.125 \qquad (3)$$

$$N=(n-0.25)\pm0.125 \qquad (4)$$

where N: number of total turns of a spring and n: integral.

In certain embodiments, a spring spacer mounts to any one of the springs described above and comprises a contact preventive portion configured to prevents a terminal end of the first turn from contacting the second turn.

A suspension unit may comprise any one of the springs described above. In certain embodiments, one or both ends of a Ti spring contacts an Fe spring bearing member(s). In certain embodiments, one or both ends of a Ti spring contacts an Al spring bearing member. In this embodiment, a resin spacer is positioned between the spring and the spring bearing member.

In certain embodiments, a vehicle comprises a suspension unit having any one of the spring structures described above.

The total number of turns in the described spring structures is selected so that when the spring is compressed or contracted, the bending directions at the end sides of the spring are different. The different bending directions reduce the possibility that the trunk of the spring will bend in a single direction relative to a center line of the spring.

Accordingly, when the spring is used in a suspension unit of a vehicle, the durability of the suspension unit may increase.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENTS

The following detailed description is directed to certain specific embodiments of the invention. However, the invention can be embodied in a multitude of different systems and methods. In this description, reference is made to the drawings wherein like parts are designated with like numerals throughout.

A spring, a suspension unit, and a vehicle according to an embodiment of the invention will be described below with reference to the drawings. An embodiment of a suspension unit and a vehicle, in which the present spring is provided, will be described with reference to FIGS. 1 through 3.

Figure 1:
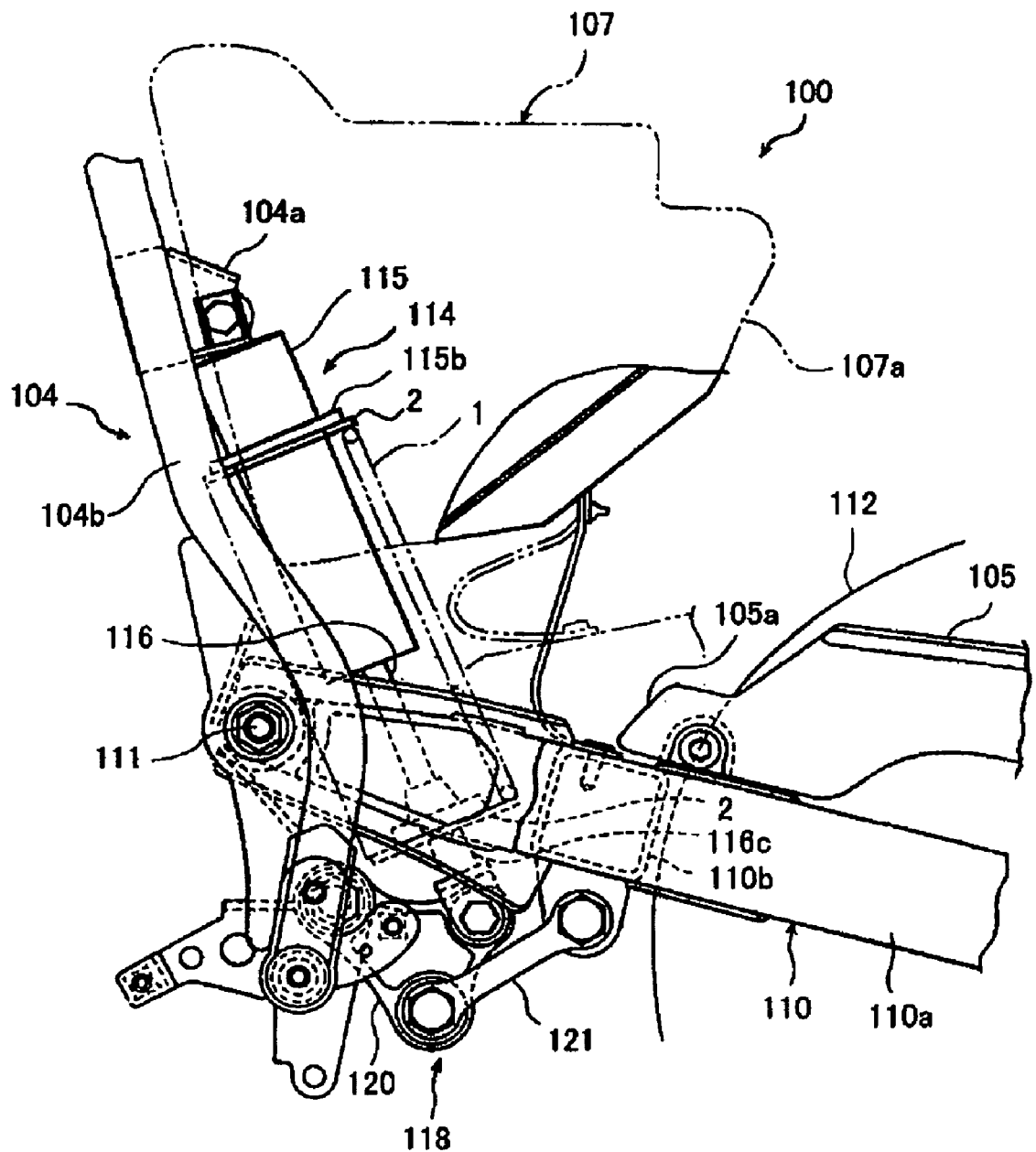
FIG. 1 is a side view of a suspension unit of a vehicle or off-road type motorcycle according to an embodiment of the invention.
Figure 2:
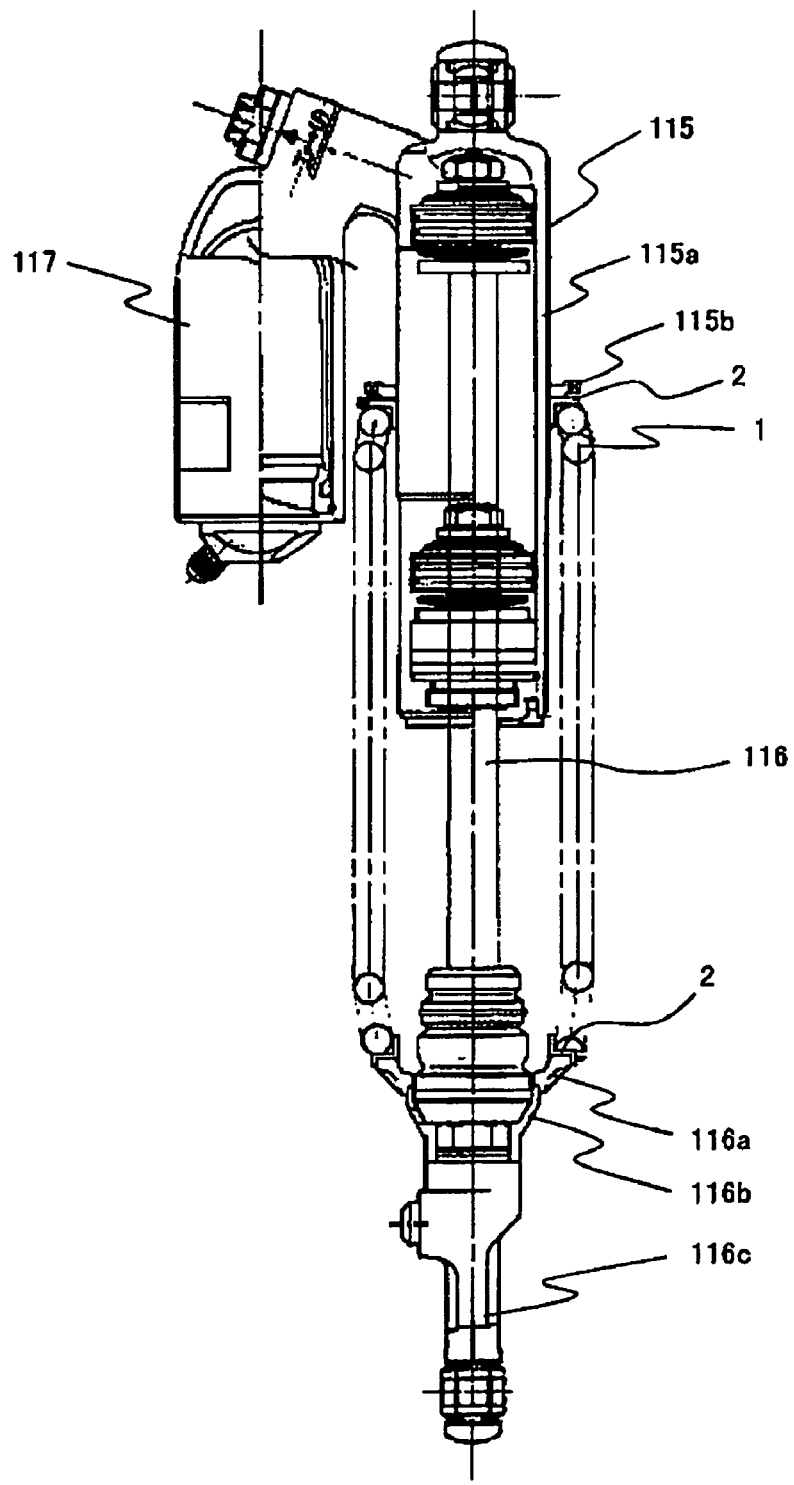
FIG. 2 is a partial, cross sectional view of the suspension unit from FIG. 1.

FIG. 1 is a side view of a suspension unit of an off-road type motorcycle according to an embodiment of the invention. FIG. 2 is a partial, cross sectional view of the suspension unit from FIG. 1.

In FIG. 1, the reference numeral 100 denotes a rear arm support of a vehicle such as an off-road type motorcycle. A vehicle frame 104 includes a rear arm bracket 104b arranged obliquely to the vehicle and in a downward direction from the vehicle frame 104. The rear arm bracket 104b diverges and extends vertically. An air cleaner 107 is arranged in a space surrounded by a seat, left and right seat rails, and left and right seat stays, which are not shown. The air cleaner 107 includes an air cleaner casing 107a. Within the air cleaner casing 107a is a filtration element for filtering air.

A pivot shaft 111 on a rear and lower end of the rear arm bracket 104b pivotally supports a rear arm 110 that freely swings up and down. A rear wheel 112 is journaled on a rear end of the rear arm 110. The rear arm 110 connects to a square-shaped cross pipe 110b located between the front ends of left and right arm portions 110a, 110a. The cross pipe 110b is positioned close to the rear wheel 112 so as to leave minimum clearance between it and a front edge of the rear wheel and provide a shorter wheelbase and strength and rigidity to the whole rear arm 110. In certain embodiments, the left and right arm portions 110a, 110a and the cross pipe 110b are integrally manufactured by casting.

Also, a chain casing 105 covering an upper portion of a drive chain is arranged on the left arm portion 110a. A front edge 105a of the chain casing 105 is positioned on an upper surface of the cross pipe 110b. In certain embodiments, the chain casing 105 is omitted from the suspension unit.

A single inverted type suspension unit 114 is arranged between the vehicle frame 104 and the rear arm 110 and on a center line of the vehicle. As shown in FIG. 2, the suspension unit 114 comprises a cylinder 115, a piston rod 116, a reservoir tank 117, a spring 1, and a linkage 118 (see FIG. 1).

The cylinder 115 is connected to a bracket 104a on a rear, upper end of the rear arm bracket 104b as shown in FIG. 1. Also, as shown in FIG. 2, the cylinder 115 is provided on an outer peripheral surface toward an upper end thereof, a male thread 115a, a lock nut 115b, and a spring bearing member 2. The lock nut 115b and the spring bearing member 2 are threaded on the male thread 115a.

The piston rod 116 is connected to a piston (not shown) and is slidably inserted into the cylinder 115. The piston rod 216 projects downward from the cylinder 115. Mounted to a lower end of the piston rod 116 are a metallic spring bearing member 2, load bearing members 116a, 116b, and link portion 116c. The lower spring bearing member 2 is paired with the upper spring bearing member 2 on the upper end. The load bearing members 116a, 116b support the spring bearing member 2.

The reservoir tank 117 is in flow communication with an interior of the cylinder 115 via a pressure oil flow passage (not shown). The reservoir tank 117 accommodates changes (increase and decrease) in pressure oil volume in the cylinder 115 when the piston rod 116 extends and contracts.

The spring 1 is exteriorly mounted to the cylinder 115 and the piston rod 116 and is held between the upper and lower bearing members 2, 2. The bias of the spring 1 can be regulated by varying a position in which the lock nut 115b and the spring bearing member 2 are clamped together. Mounted to the spring 1 is a spring spacer 5 (see FIGS. 9 through 11).

The linkage 118 includes, as shown in FIG. 1, a first link 120 pivotally mounted to a lower end of the rear arm bracket 104b and a second link 121 pivotally mounted to a lower surface of the cross pipe 110b. The piston rod 116 is connected to the rear arm 110 by connecting the link portion 116c of the piston rod 116 to the first link 120 of the linkage 118.

The spring bearing member 2 includes a metallic member having a cylindrical-shaped trunk portion 2a and flange portion 2b (see FIG. 1). The flange portion 2b bears a load of the spring 1 and is integral with the trunk portion 2a. One of the spring bearing members 2 is threaded on the inside of the trunk portion 2a with a female thread (not shown). The female thread is threaded on the male thread 115a of the cylinder 115.

The spring bearing members 2 support both ends of the spring 1 and may bear a load of, for example, 7500 N when the suspension unit experiences off-roading as shown in FIG. 2.

In addition, the surface of the flange portion 2b that abuts the spring 1 corresponds to a "spring bearing surface." The spring bearing surface bears a load of the spring 1.

In certain embodiments, the spring bearing members 2 in contact with both ends of the spring 1 are made of Fe. For suspension units having a Ti spring and Fe spring bearing members 2, the chance for electrolytic corrosion occurring due to the dissimilar materials being in contact with one another is reduced. That is, Fe has a smaller electric potential difference relative to Ti than other metals. For spring bearing members 2 made of Fe, it is possible to prevent electrolytic corrosion of the spring bearing members 2 while ensuring durability for a load of spring 1 made of Ti.

Figure 3:
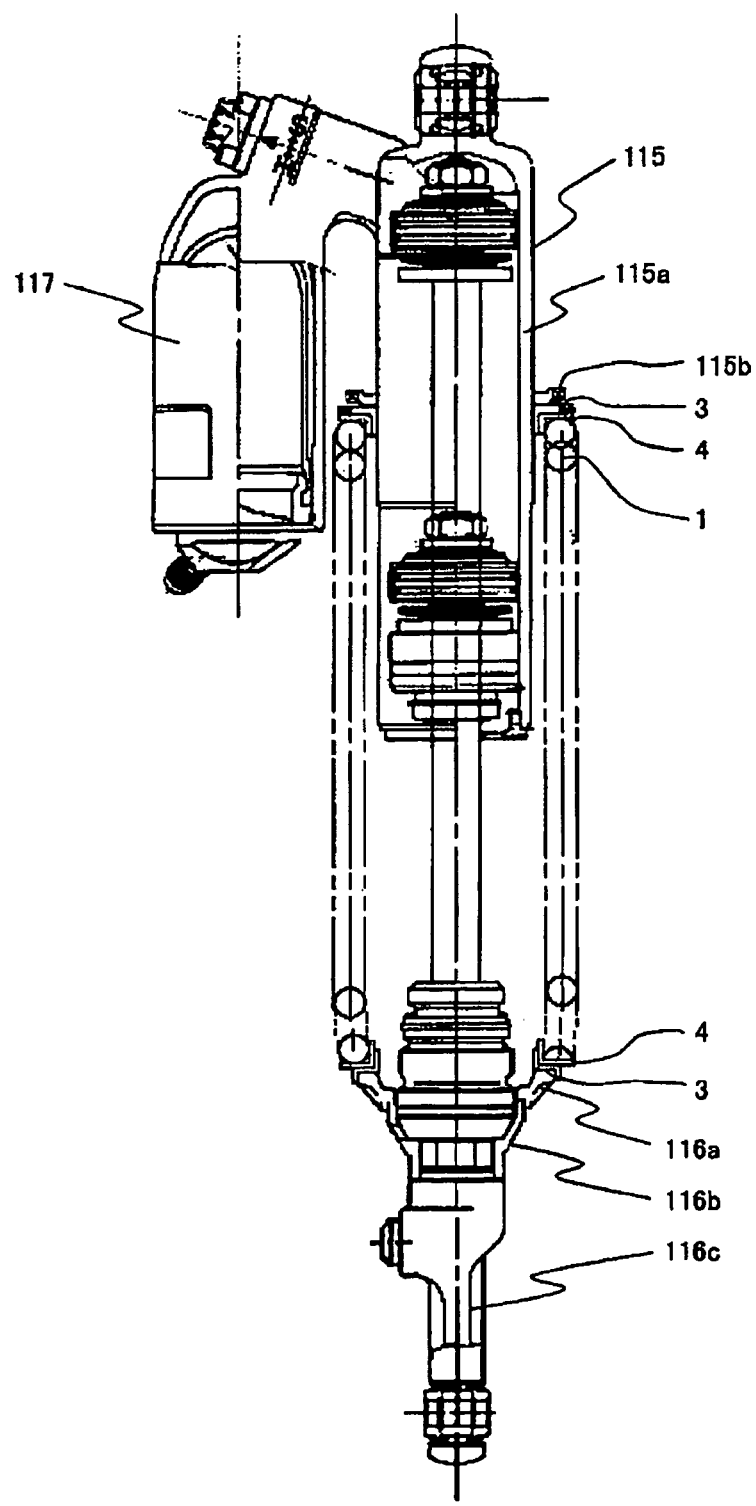
FIG. 3 is a partial, cross sectional view of a suspension unit having aluminum spring bearing members according to another embodiment of the invention.

FIG. 3 is a partial, cross sectional view of a suspension unit having aluminum spring bearing members 3 according to another embodiment of the invention. As shown in FIG. 3, the spring bearing members 3 are made of Al. The spacers 4 are made of a resin and may be positioned between both ends of the spring 1 and the spring bearing members 3. With such construction, electrolytic corrosion of a spring 1 made of Ti and the spring bearing members 3 made of Al is prevented. The use of aluminum for the spring bearing members 3 rather than Fe advantageously reduces the weight of the suspension unit.

The spring 1 is described with reference to FIGS. 4 through 8. For ease of explanation, the spring 1 according to the embodiment is referred simply below to as "spring 1". However, embodiments of the spring may be made of different materials, including Ti and the like. Also, while FIGS. 4 through 8 show a spring having one or more features of the invention and a comparative example of a conventional spring that does not include such features, both the spring 1 and the conventional spring are referred as "spring 1" in the following description.

Figure 4:
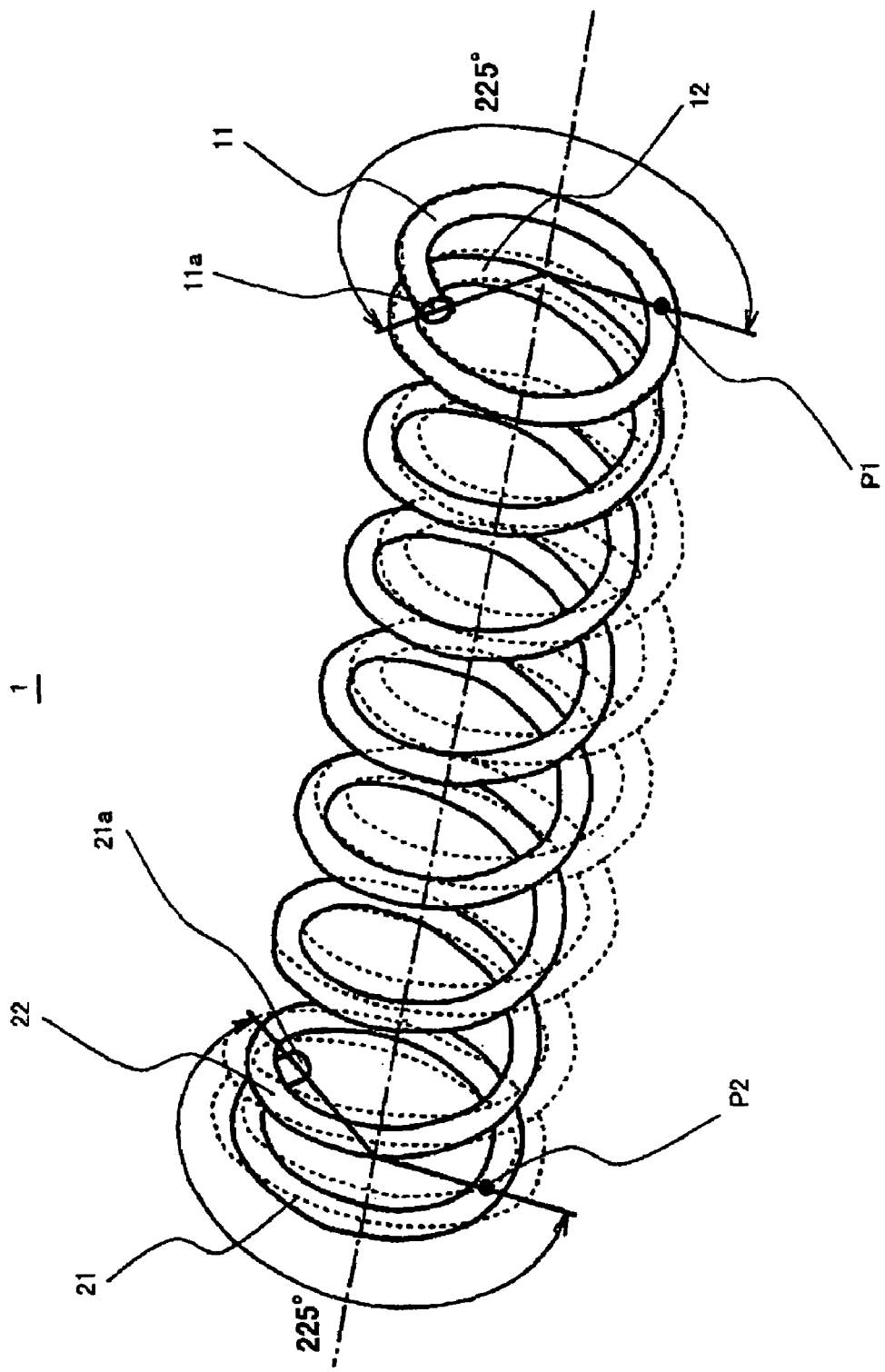
FIG. 4 is a perspective view illustrating a spring buckling in dashed lines.
Figure 5:
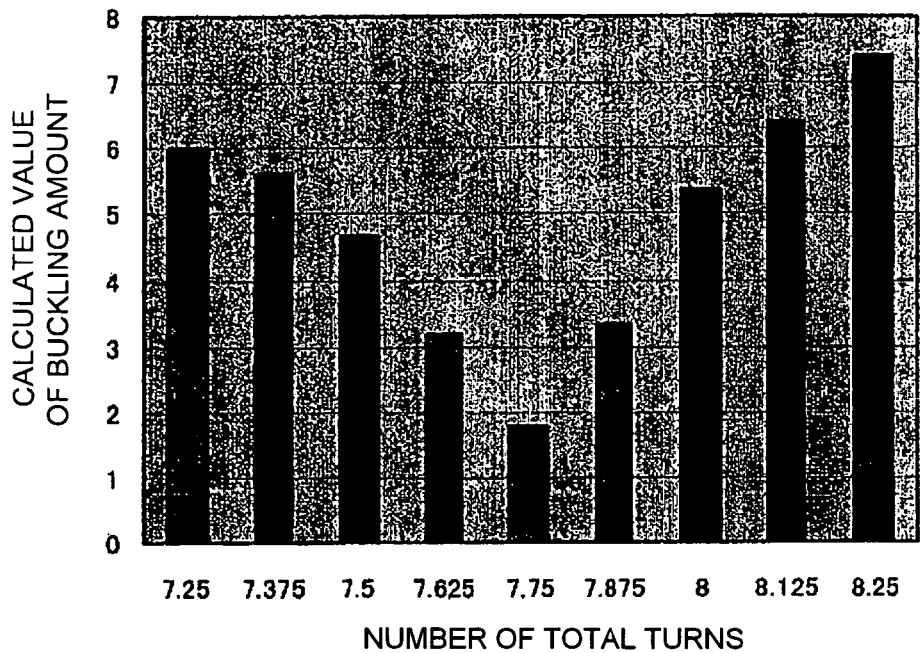
FIG. 5 is a bar graph illustrating a relationship between the number of total turns of a spring and a buckling value derived from simulation data.
Figure 6:
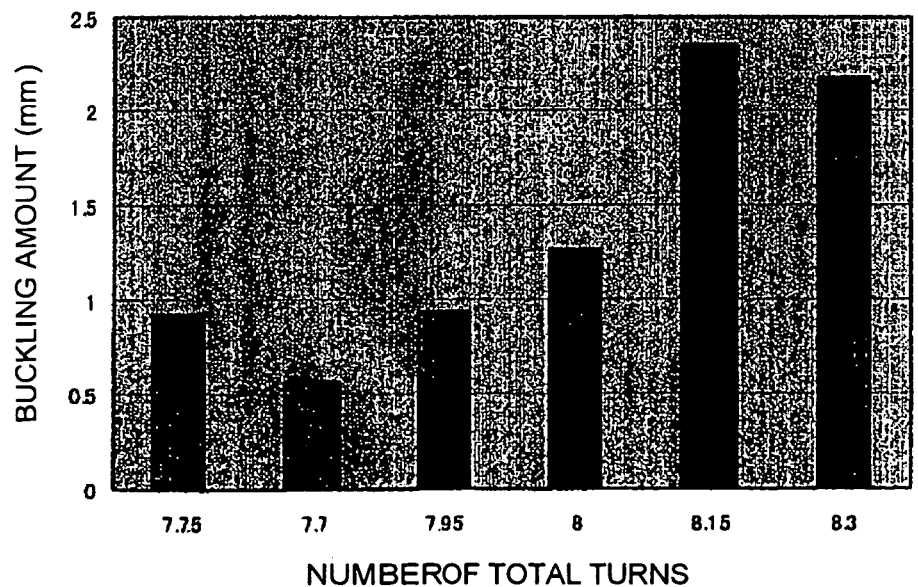
FIG. 6 is a bar graph illustrating a relationship between the number of total turns of a prototype spring and a buckling value.
Figure 7:
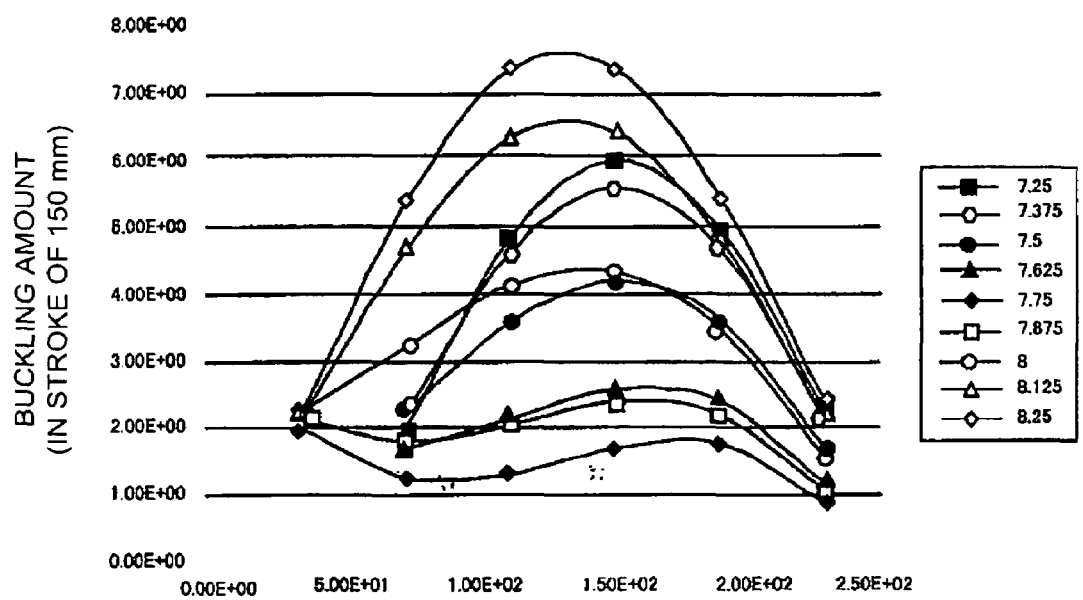
FIG. 7 is a graph illustrating amounts of buckling at respective points for springs with different numbers of total turns.
Figure 8:
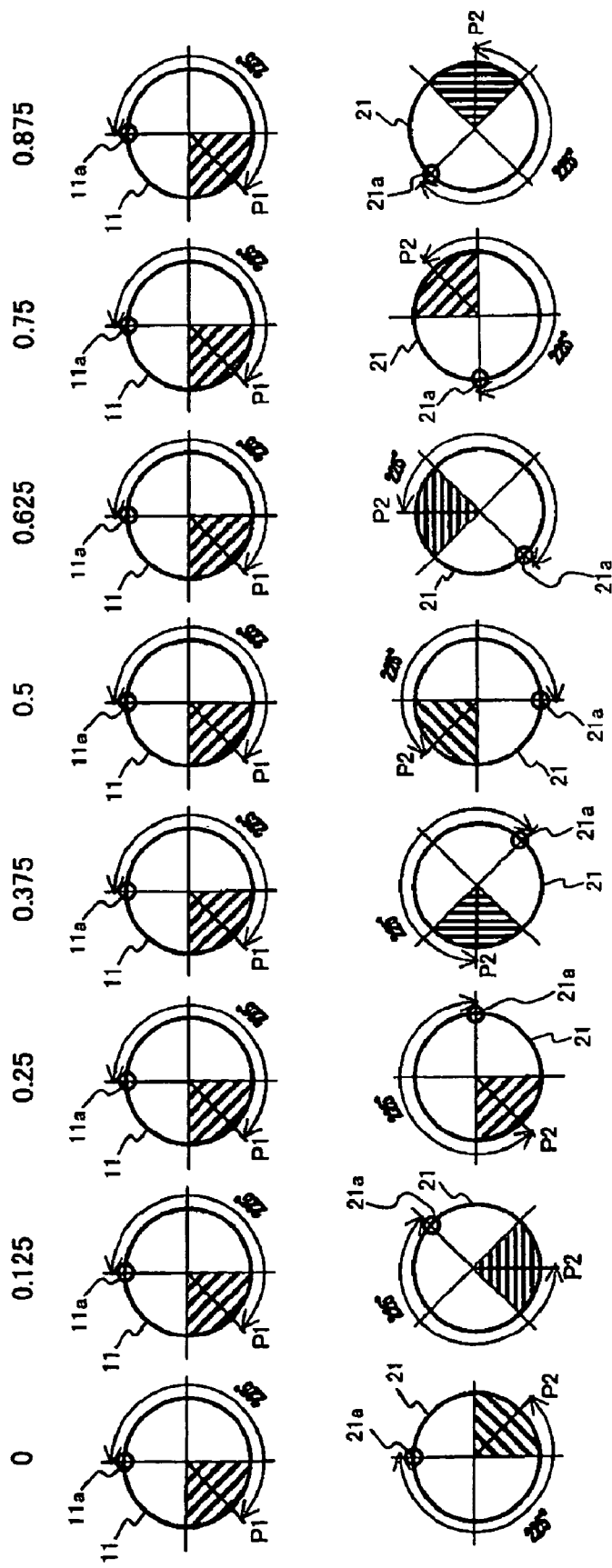
FIG. 8 shows plan views of both ends of eight different springs with from 0 to 0.875 total turns and illustrates a relationship between the number of total turns and buckling.

FIG. 4 is a perspective view illustrating a spring buckling in dashed lines. FIG. 5 is a bar graph illustrating a relationship between the number of total turns of a spring and a buckling value derived from simulation data. FIG. 6 is a bar graph illustrating a relationship between the number of total turns of a prototype spring and a buckling value. FIG. 7 is a graph illustrating amounts of buckling at respective points for springs with different numbers of total turns. FIG. 8 shows plan views of both ends of eight different springs with from 0 to 0.875 total turns and illustrates a relationship between the number of total turns and buckling.

In FIG. 4, buckling of the spring 1 generally means trunk bending relative to a center line of the spring 1 and occurs when the spring 1 is contracted or compressed (see dotted lines in FIG. 4). The inventors of the present application varied the number of total turns, wire diameter, total length of the spring, and fixing and releasing both ends of the spring as part of a simulation to identify contributing factors of buckling. The inventors found that the number of total turns has a greater influence on buckling than the other factors.

As part of the simulation, buckling amounts were calculated for nine kinds of springs 1 having a number of total turns from 7.25 to 8.25 (see FIG. 5). Based on the results of the simulation, an experiment was performed on six different prototype springs having a number of total turns from 7.75 to 8.3 (see FIG. 6). For the simulation, a stroke length at the time of contraction was set to 150.0 mm. Since the experiment on the prototypes resulted in contact between the wire portions using the stroke length from the simulation, the stroke length for the prototypes was reduced to 112.5 mm at the time of contraction.

As the result of the simulation and the experiment on the prototypes, the amount of buckling was influenced by the number of total turns of the springs 1. Also, as a result of the testing, a suspension spring undergoes less buckling when the number of total turns is about 7.75.

Amounts of buckling at respective points of a winding were further simulated with respect to the same nine different kinds of springs 1 from the simulation described above (see FIG. 7). In FIG. 7, the X axis corresponds to respective points of a winding from one end of a spring to the other end thereof. The Y axis corresponds to buckling amount. Accordingly, the shape of a curve for each of the nine springs is indicative of the actual shapes of the springs when buckling occurs.

As a result of the simulation, large buckling does not occur when a number of total turns is 7.625, 7.75 and 7.875 and the direction of bending for one end side of the spring 1 is different from the direction of bending for the other end side of the spring at the time of contraction. Large buckling does occur when a number of total turns are other than 7.625, 7.75 and 7.875 and the direction of bending for one end side of the spring overlaps the direction of bending for the other end side of the spring at the time of contraction.

The inventors determined that points P1, P2 of maximum bending at the time of contraction of the spring 1 are located on the first turns 11, 21 of the spring 1 at about 225° from each terminal end 11a, 21a in a direction towards the second turns of the spring 1 (see second turns 12, 22).

Thereupon, the points P1, P2 of maximum bending indicate those points on the respective first turns 11, 21 which make maximum displacements when subjected to a compressive load. It is considered that the points P1, P2 of maximum bending make starting points when the spring 1 undergoes buckling. In addition, it is considered that the points P1, P2 of maximum bending are not in agreement with those positions, which form about 225° in directions toward second turns from terminal ends 11a, 21a but are present in the neighborhood of about 225°.

Hereupon, the inventors of the present application have found that the regions (see hatched portions in FIG. 8) of the respective first turns 11, 21 on one end side and the other end side of the spring 1, which form about ±45° relative to positions of about 225° in directions toward the second turns from the terminal ends 11a, 21a, or the points P1, P2 of maximum bending at the time of contraction, preferably do not overlap each other. With such construction, the direction of bending for one end side of the spring was different than the direction of bending for the other end side of the spring at the time of contraction and buckling was less likely to occur.

In order to provide for the construction, a number of total turns of the spring 1 is represented by the following formula (1) or (2).

$$N = n + 0.75 \quad (1)$$

$$N = n - 0.25 \quad (2)$$

where N: number of total turns of a spring and n: integral.

As shown in a plan view of FIG. 8 for (0.75), with a spring 1 having a number N of total turns that meets the formula (1) or (2), those regions of the respective first turns 11, 21, which form about ±45° relative to positions of about 225° in directions toward the second turns from the terminal ends 11a, 21a, or the points P1, P2 of maximum bending at the time of contraction, are positioned on opposite sides and do not overlap each other. In this case, directions of bending at the time of contraction are opposite to each other on one end side and the other end side of the spring 1 reduced buckling the most.

Also, a number of total turns of the spring 1 may be represented by the following formula (3) or (4).

$$N=(n+0.75)\pm 0.125 \quad (3)$$

$$N=(n-0.25)\pm 0.125 \quad (4)$$

where N: number of total turns of a spring and n: integral.

As shown in a plan view of FIG. 8 for (0.625) or (0.875), with a spring 1 having a number N of total turns that meets the formula (3) or (4), those regions of the respective first turns 11, 21, which form about ±45° relative to positions of about 225° in directions toward the second turns from the terminal ends 11a, 21a, or the points P1, P2 of maximum bending at the time of contraction, do not overlap each other. Also, in this case, directions of bending at the time of contraction are opposite to each other on one end side and the other end side of the spring 1 to reduce buckling.

On the contrary, the case where a number of total turns of the spring 1 may be deduced from the following formulae (5) to (9) is shown in plan views of FIG. 8 for (0.5), (0.375), (0.25), (0.125) or (0). That is, those regions of the respective first turns 11, 21 of the spring 1, which form about ±45° relative to positions of about 225° in directions toward the second turns from the terminal ends 11a, 21a, or the points P1, P2 of maximum bending at the time of contraction, overlap each other partially or wholly. As a result, directions of bending at the time of contraction overlap each other on both end sides of the spring 1, so that large buckling occurs in one direction.

$$N=n+0.5 \quad (5)$$

$$N=n+0.375 \quad (6)$$

$$N=n+0.25 \quad (7)$$

$$N=n+0.125 \quad (8)$$

$$N=n \quad (9)$$

where N: number of total turns of a spring and n: integral.

When the number of total turns of the spring 1 is selected so that the directions of bending at the time of contraction at the end sides of the spring are different, it is possible to reduce trunk bending relative to a center line of the spring 1 in one direction, that is, buckling.

Accordingly, when the spring 1 is used for the suspension unit 114 of a vehicle such as a motorcycle, it is possible to reduce buckling of the spring 1 in the suspension unit 114 and the vehicle.

As a result, for example, in the case where a spring of small wire diameter made of Fe is replaced in an existing suspension unit 114 by a Ti spring having a larger wire diameter, buckling of the Ti spring may be reduced so as to prevent contact with the cylinder 115 of the suspension unit 114.

Figure 9:
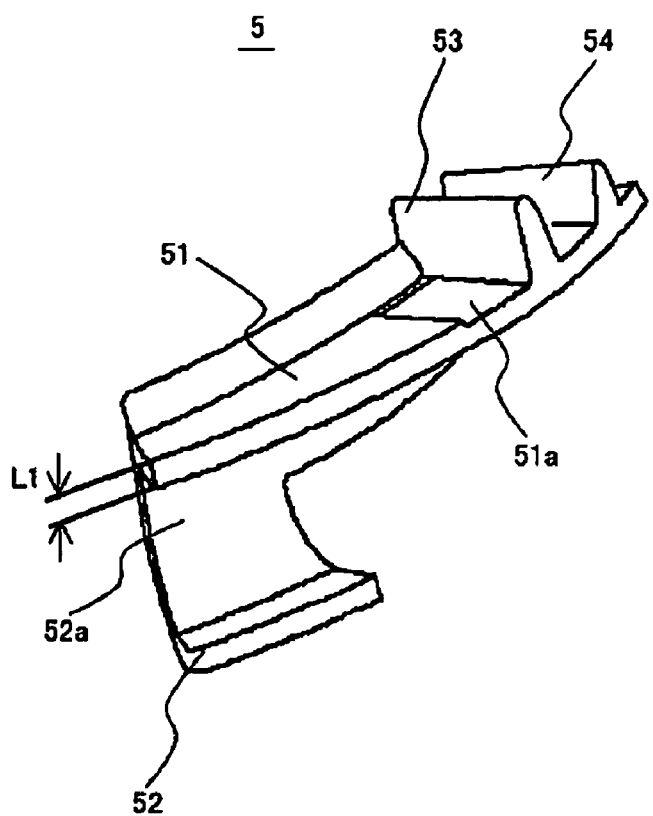
FIG. 9 is a perspective view of a spring spacer according to an embodiment.
Figure 10:
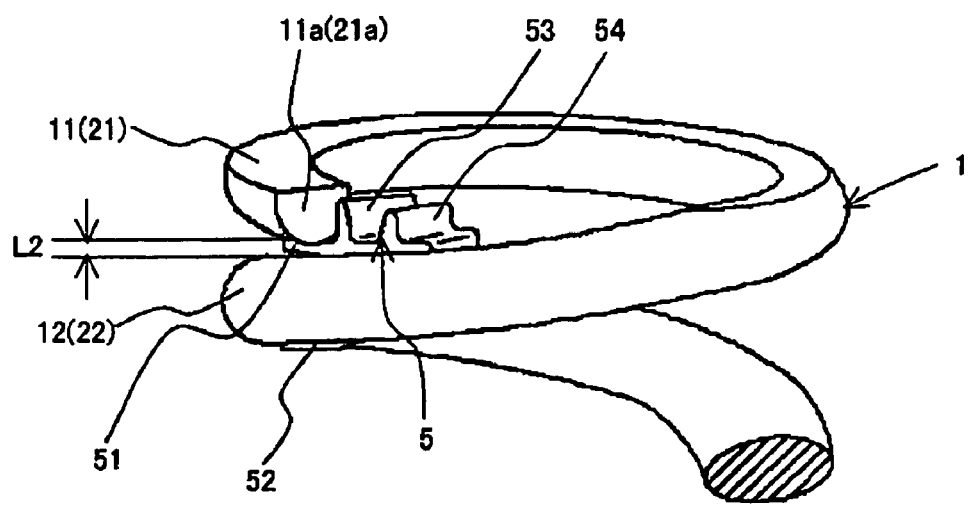
FIG. 10 is a perspective view of the spring spacer from FIG. 9 mounted to a spring.
Figure 11:
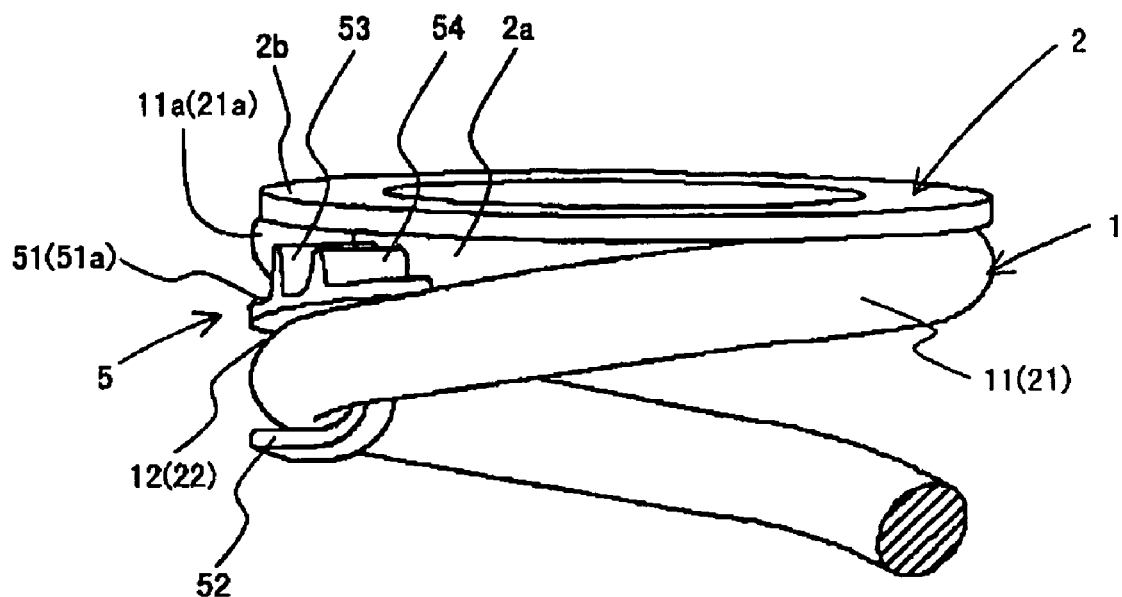
FIG. 11 is a perspective view of the spring spacer and a spring bearing member mounted to the spring according to an embodiment.

In certain embodiments, a spring spacer is mounted to the spring 1 (the Ti spring) as shown in FIGS. 9 through 11. FIG. 9 is a perspective view of a spring spacer according to an embodiment. FIG. 10 is a perspective view of the spring spacer from FIG. 9 mounted to a spring. FIG. 11 is a perspective view of the spring spacer and a spring bearing member mounted to the spring according to an embodiment.

In FIG. 9, the spring spacer 5 comprises an elastic engagement piece (holding portion) 52 that is formed contiguous to a side of a plate-shaped contact preventive portion 51 and extends downward and outward. The spring spacer 5 further comprises latches 53, 54. The latches 53, 54 are positioned at a predetermined interval along a tip end side of the contact preventive portion 51.

The thickness L1 of the contact preventive portion 51 is selected to ease assembly with the spring. A clearance L2 between a first turn 11 (21) and a second turn 12 (22) of the spring 1 is shown in FIG. 10. By selecting L1 in view of L2, it is possible to insert and arrange the contact preventive portion 51 into the clearance L2. Also, the contact preventive portion 51 has an arcuate shape that has substantially the same radius of curvature as that of the first turn 11 and the second turn 12 of the spring 1. Further, a stepwise recess 51a is provided on that portion of the contact preventive portion 51 and corresponds to a terminal end 11a (21a) of the first turn 11. The recess 51a is thinner than the remaining portion.

An inner peripheral surface 52a of the elastic engagement piece 52 has an arcuate cross section that corresponds to an inner peripheral surface of the second turn 12 of the spring 1. With this construction, the inner peripheral surface of the second turn 12 is elastically held. Further, the radius of curvature of the inner peripheral surface 52a of the elastic engagement piece 52 is a little smaller than the inner peripheral surface of the second turn 12 of the spring 1. With this construction, a sufficient holding force is obtained even if there is a dimensional error in the diameter of the second turn 12.

A pair of latches 53, 54 includes piece members, which are different in height and thickness from each other. The latch 53 is larger in height and smaller in thickness as compared with the latch 54 making the latch 53 susceptible to deformation upon application of a load from above. Also, the latch 53 is made substantially triangular in cross section and has a larger thickness on a base side whereby the latch 53 is more resistant to deformation upon application of a lateral load. The latch 53 abuts against the end 11a of the first turn 11 of the spring 1 and prevents the spring spacer 5 from moving toward the second turn 12.

Also, the latch 54 is smaller in height and larger in thickness as compared with the latch 53. The latch 54 is less susceptible to deformation upon application of a load from above than latch 53. In certain embodiments where the spring bearing members 2 shown in FIG. 11 is mounted on the terminal end 11a of the first turn 11 of the spring 1, a space toward the first turn 11 is narrowed in height by the latch 54 and prevents movement of the spring spacer 5 toward the first turn 11.

A method of mounting the spring spacer 5 on the spring 1 is described below. As shown in FIG. 10, as the contact preventive portion 51 of the spring spacer 5 is inserted into the clearance L2 between the first turn 11 and the second turn 12 of the spring 1, the elastic engagement piece 52 of the spring spacer 5 engages with the inner peripheral surface of the second turn 12 of the spring 1 to temporarily latch the spring spacer 5 thereon.

Thereafter, as shown in FIG. 11, mounting of the spring spacer 5 is completed by mounting the spring bearing members 2 to the first turn 11 of the spring 1. That is, the trunk portion 2a of the spring bearing members 2 is pushed onto an inner periphery of the first turn 11 of the spring 1 and causes the torus-shaped flange portion 2b to abut against a terminal end 11b of the first turn 11 of the spring 1. Thereby, the trunk portion 2a of the spring bearing members 2 holds down the spring spacer 5 from inside the spring 1 to prevent the spring spacer 5 from coming-out inside the spring 1. Also, the elastic engagement piece 52 abuts against the inner peripheral surface of the second turn 12 to prevent coming-out of the spring spacer 5 outside the spring 1.

In the case where the spring spacer 5 is mounted to the spring 1, a simple structure surely prevents contact between the terminal end 11a of the first turn 11 and the second turn 12 of the spring 1, which is made of Ti or the like and low in surface hardness, to improve durability. Accordingly, conjointly with the effect of reducing buckling in the spring 1 according to the embodiment, it is possible to increase the reliability of the suspension unit 114 and the vehicle comprising the spring.

Also, the thickness L1 of the contact preventive portion 51 is selected to ease assembly in view of the clearance L2 between the first turn 11 and the second turn 12 of the spring 1 where the contact preventive portion 51 is mounted. Thereby, the spring spacer 5 can be readily mounted in the clearance L2 between the first turn 11 and the second turn 12 of the spring 1.

Besides, with the spring spacer 5 according to the embodiment, by elastically engaging the elastic engagement piece 52 with the inner peripheral surface of the second turn 12 of the spring 1, it is possible to stably hold the spring spacer 5 in the clearance L2 between the first turn 11 and the second turn 12 of the spring 1. Thereby, mounting of the spring spacer 5 to the spring 1 is easy.

In addition, the invention is not limited to the spring, the suspension unit, and the vehicle according to the respective embodiments described above. For example, the spring according to the embodiment is not limited to Ti springs but can reduce buckling in springs made of materials besides Ti. Also, the spring according to the invention can be applied widely to units other than suspension units.

Further, a spring spacer mounted on the spring according to the invention is not limited to only the embodiments described herein, but also includes embodiments of spring spacers disclosed in U.S. Patent Application No. 2004-364417, and in U.S. Patent Application No. 11/303436, filed on even date herewith, entitled SPRING SPACER FOR A SPRING, the entire contents of which are hereby incorporated by reference.

In addition, while a motorcycle type vehicle has been described in the embodiments above, the invention is not limited to motorcycles. Besides, "vehicle", to which the present spring is applicable, includes motorcycles and automobiles. Stated in detail, "motorcycle" means a motorcycle and includes bicycles with a motor (motorbike) and scooters, "motorcycle" specifically meaning a vehicle capable of turning with a vehicle body inclined. Accordingly, included in "motorcycle" is a vehicle, of which at least one of a front wheel and a rear wheel is made two or more in number and which belongs to tricycles, four-wheel cars (or more) in terms of the number of tires. Further, the present spring spacer is applicable to a so-called saddle-ride type vehicle, such as snowmobile, four-wheel buggy (ATV: All Terrain Vehicle), in addition to "motorcycle".

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention.

Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A spring having a first end separated from a second end by turns of the spring, wherein a total number of the turns are selected so that a direction of bending at the first end is different than a direction of bending at the second end when the spring is contracted, and wherein the direction of bending at the first end of the spring is located at a first point of maximum bending, and the direction of bending at the second end of the spring is located at a second point of maximum bending, wherein a first region centered on the first point of maximum bending and spanning ±45° does not overlap a second region centered on the second point of maximum bending and spanning ±45°.

2. The spring according to claim 1, wherein the direction of bending at the first end of the spring is located 225° from a first terminal end of the spring and the direction of bending at the second end of the spring is located 225° from a second terminal end of the spring.

3. The spring according to claim 1, further comprising a spring spacer mounted to the spring, the spring spacer comprising a contact preventive portion configured to prevent a terminal end of a first turn of spring from contacting a second turn of the spring.

4. A spring having a number of total turns according to the following formula:

$$N=n+0.75,$$

where N is the number of total turns of the spring and n is an integer; and wherein a direction of bending at a first end of the spring is located at a first point of maximum bending, and a direction of bending at a second end of the spring is located at a second point of maximum bending, wherein a first region centered on the first point of maximum bending and spanning ±45° does not overlap a second region that is centered on the second point of maximum bending and spanning ±45°.

5. The spring according to claim 4, wherein the direction of bending at the first end of the spring is located 225° from a first terminal end of the spring and the direction of bending at the second end of the spring is located 225° from a second terminal end of the spring.

6. A spring having a number of total turns according to the following formula:

$$N=n-0.25,$$

where N is the number of total turns of the spring and n is an integer; and wherein a direction of bending at a first end of the spring is located at a first point of maximum bending, and a direction of bending at a second end of the spring is located at a second point of maximum bending, wherein a first region centered on the first point of maximum bending and spanning ±45° does not overlap a second region that is centered on the second point of maximum bending and spanning ±45°.

7. A spring according to claim 6, wherein the direction of bending at the first end of the spring is located 225° from a first terminal end of the spring and the direction of bending at the second end of the spring is located 225° from a second terminal end of the spring.

8. A spring having a number of total turns according to the following formula (3) or (4)

$$N=(n+0.75)\pm0.125 \quad (3)$$

$$N=(n-0.25)\pm0.125 \quad (4)$$

where N is the number of total turns of the spring and n is an integer; and wherein a direction of bending at a first end of the spring is located at a first point of maximum bending, and a direction of bending at a second end of the spring is located at a second point of maximum bending, wherein a first region centered on the first point of maximum bending and spanning ±45° does not overlap a second region that is centered on the second point of maximum bending and spanning ±45°.

9. The spring according to claim 8, wherein the first end of the spring is separated from the second end by turns of the spring, wherein the number of total number is selected so that the direction of bending at the first end is different than the direction of bending at the second end when the spring is contracted.

10. A suspension unit comprising:
a spring having a first end separated from a second end by turns of the spring, wherein a total number of the turns are selected so that a direction of bending at the first end is different than a direction of bending at the second end when the spring is contracted; and wherein the direction of bending at the first end of the spring is located at a first point of maximum bending, and the direction of bending at the second end of the spring is located at a second point of maximum bending, wherein a first region centered on the first point of maximum bending and spanning ±45° does not overlap a second region centered on the second point of maximum bending and spanning ±45°.

11. The suspension unit according to claim 10, further comprising a spring bearing member, wherein the spring comprises Ti and the spring bearing member comprises Fe, and wherein the spring bearing member contacts at least one end of the spring.

12. The suspension unit according to claim 10, further comprising a spring bearing member and a spacer, wherein the spring comprises Ti and the spring bearing member comprises Al, and wherein the spring bearing member contacts at least one end of the spring, and wherein the spacer comprises resin and is positioned between the spring and the spring bearing member.

13. The suspension unit according to claim 10, wherein the direction of bending at the first end of the spring is located 225° from a first terminal end of the spring and the direction of bending at the second end of the spring is located 225° from a second terminal end of the spring.

14. The suspension unit according to claim 10, further comprising a spring spacer mounted to the spring, the spring spacer comprising a contact preventive portion configured to prevent a terminal end of a first turn of spring from contacting a second turn of the spring.

15. The suspension unit according to claim 10, wherein a number of total turns of the spring satisfies the following formula:

$$N=n+0.75$$

where N is the number of total turns of the spring and n is an integer.

16. The suspension unit according to claim 10, wherein a number of total turns of the spring satisfies the following formula:

$$N=n-0.25$$

where N is the number of total turns of the spring and n is an integer.

* * * * *